United States Patent
McDonnell et al.

(10) Patent No.: US 6,460,874 B1
(45) Date of Patent: Oct. 8, 2002

(54) AIR BAG MODULE DEPLOYMENT DOOR WITH SNAP-IN FEATURE

(75) Inventors: Jonathan McDonnell, Berkley; William C. Haps, Jr., Roseville; Garry Hayes, Rochester Hills, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/717,961

(22) Filed: Nov. 20, 2000

(51) Int. Cl.[7] ................................................ B60R 21/16
(52) U.S. Cl. .................................. 280/728.2; 280/728.3
(58) Field of Search ............................ 280/728.2, 728.3, 280/732

(56) References Cited

U.S. PATENT DOCUMENTS

| | | | |
|---|---|---|---|
| 4,770,439 A | | 9/1988 | Maier et al. |
| 5,145,207 A | | 9/1992 | Bederka et al. |
| 5,403,033 A | * | 4/1995 | Koma ...................... 280/728.1 |
| 5,482,313 A | | 1/1996 | Ikeya et al. |
| 5,489,116 A | * | 2/1996 | Boag ........................ 280/728.2 |
| 5,522,616 A | | 6/1996 | Bauer et al. |
| 5,527,064 A | * | 6/1996 | Kai et al. ................. 280/728.2 |
| 5,803,487 A | | 9/1998 | Kikuchi et al. |
| 5,820,157 A | * | 10/1998 | Matsumoto .............. 280/728.2 |
| 5,887,891 A | | 3/1999 | Taquchi |
| 5,975,563 A | | 11/1999 | Gallagher et al. |
| 6,012,735 A | | 1/2000 | Gray et al. |

\* cited by examiner

Primary Examiner—Anne Marie Boehler
Assistant Examiner—Faye M. Fleming
(74) Attorney, Agent, or Firm—Tarolli, Sundheim, Covell, Tummino & Szabo L.L.P.

(57) ABSTRACT

A vehicle occupant safety apparatus (10) for inserting into and covering an opening (22) of an instrument panel (12) comprises an air bag module (14). The air bag module (14) has an air bag (50), which is inflatable through the opening (22) in the instrument panel (12) for protecting a vehicle occupant during a crash condition. The apparatus (10) further comprises a door (16) for covering the opening (22) in the instrument panel (12). The door (16) is attached to the air bag module (14) and is movable relative to the air bag module (14) to locate the door (16) relative to the instrument panel (12). The door (16) and the instrument panel (12) have respective interlocking portions (34 and 90), which snap together to attach the door (16) to the instrument panel (12). The interlocking portions (34 and 90) snap together when the air bag module (14) is inserted into the opening (22) in the instrument panel (22) and the door (16) is moved relative to the air bag module (14) into a position to cover the opening (22). The interlocking portions (34) of the instrument panel (12) are deflected when the respective interlocking portions (34 and 90) of the door (16) and the instrument panel (12) snap together.

12 Claims, 3 Drawing Sheets

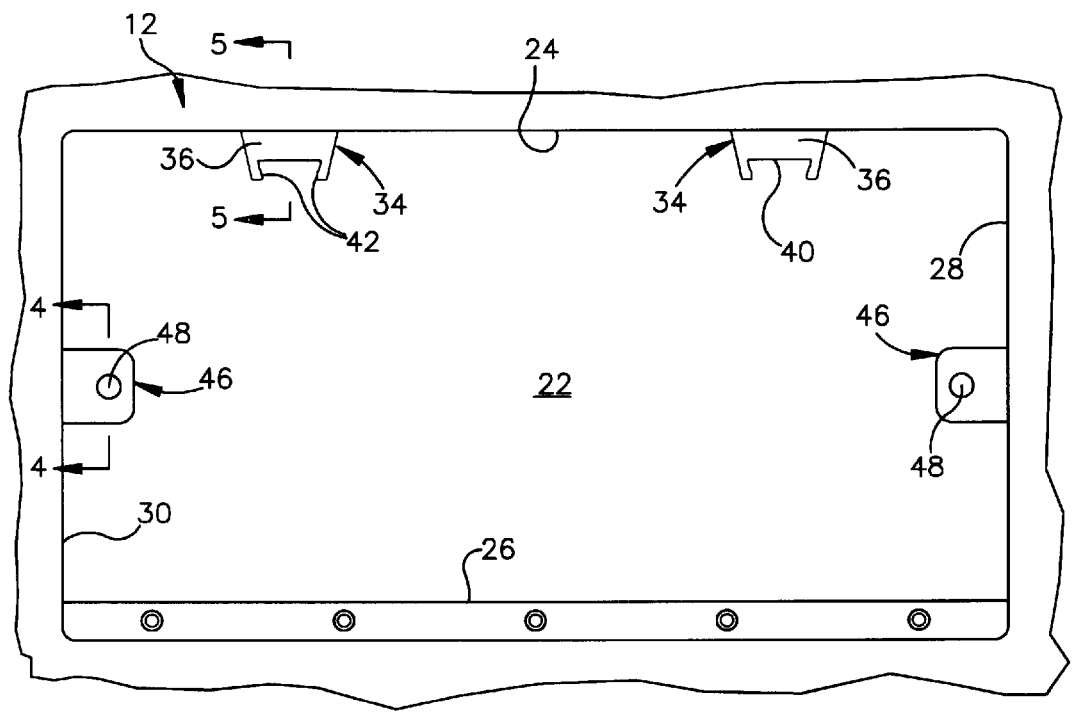
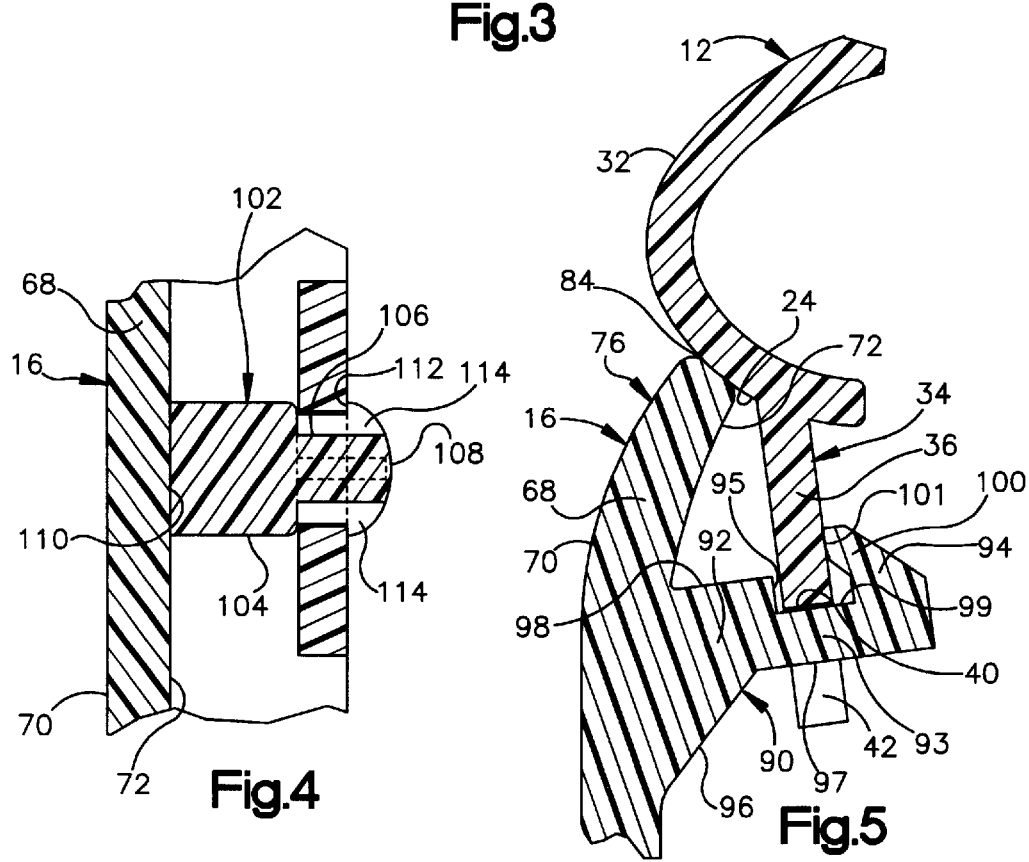

AIR BAG MODULE DEPLOYMENT DOOR WITH SNAP-IN FEATURE

TECHNICAL FIELD

The present invention relates to a vehicle occupant safety apparatus and, more particularly, to a vehicle occupant safety apparatus with a deployment door that attaches to a vehicle instrument panel.

BACKGROUND OF THE INVENTION

A known vehicle occupant safety apparatus includes an air bag module having an inflatable air bag, an inflator for inflating the air bag, and a reaction can that receives the air bag and the inflator. The air bag module is mounted within an instrument panel of a vehicle. The known vehicle occupant safety apparatus has a deployment door or cover that is attached to the reaction can and hides the air bag, inflator, and reaction can from view when the module is installed in the instrument panel. Thus, the deployment door covers an opening in the instrument panel through which the air bag module is installed and through which the air bag expands upon inflation. The deployment door is attached to the reaction can such that the door can "float" or move relative to the reaction can. After the air bag module is installed in the instrument panel, the deployment door can be properly oriented relative to the instrument panel and then fixed to the instrument panel.

SUMMARY OF THE INVENTION

The present invention is directed to a vehicle occupant safety apparatus. The apparatus comprises an air bag module having an air bag that is inflatable through an opening of the instrument panel for helping to protect a vehicle occupant during a crash condition. The apparatus further comprises a door for covering the opening in the instrument panel. The door is attached to the air bag module and is movable relative to the air bag module to position the door relative to the instrument panel. The door and the instrument panel have respective interlocking portions that snap together to attach the door to the instrument panel when the air bag module is inserted into the opening in the instrument panel and the door is moved relative to the air bag module. The interlocking portions of the instrument panel are deflected when the respective interlocking portions of the door and the instrument panel snap together.

The present invention also is directed to a method of mounting a vehicle occupant safety apparatus in an opening of an instrument panel. In the method, a door is attached to an air bag module in a manner such that the door is movable relative to the air bag module. The air bag module is inserted into the opening in the instrument panel. The door is moved relative to the air bag module and relative to the instrument panel so that respective interlocking portions of the instrument panel and the door snap together. The interlocking portions of the instrument panel are deflected when the interlocking portions of the door and the instrument panel snap together.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a view taken along line 3—3 in FIG. 1;

FIG. 4 is a view of the instrument panel taken along line 4—4 in FIG. 3 and showing a button supporting a portion of a door of the vehicle occupant safety apparatus; and FIG. 5 is a view of the instrument panel taken along line 5—5 in FIG. 3 and showing a portion of the door of the vehicle occupant safety apparatus attached to the instrument panel.

DESCRIPTION OF PREFERRED EMBODIMENT

Figure 1:
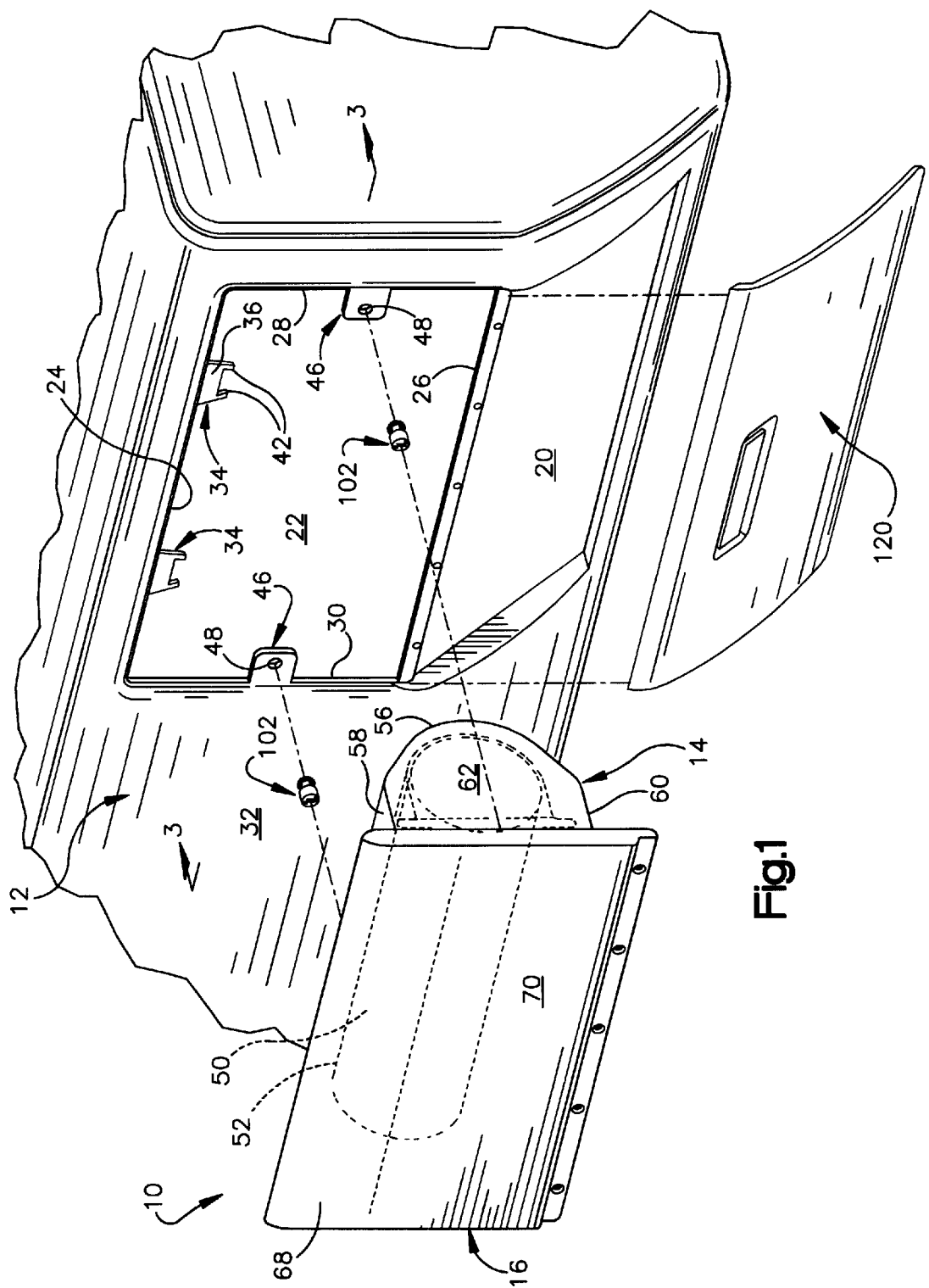
FIG. 1 is a view of a vehicle occupant safety apparatus of the present invention prior to being mounted in an opening of an instrument panel.

FIG. 1 illustrates a vehicle occupant safety apparatus 10 of the present invention prior to being mounted in an opening 22 of an instrument panel 12 of a vehicle.

The instrument panel 12 extends laterally in the vehicle from a location near a driver-side door (not shown) to a location near a passenger-side door (not shown). The instrument panel 12 extends vertically from a position near the steering column (not shown) to a position meeting a bottom surface of the vehicle windshield (not shown). On the driver-side of the vehicle, the instrument panel 12 includes a gauge console (not shown), generally located directly behind the steering wheel (not shown) of the vehicle. On the passenger-side of the vehicle, the instrument panel 12 includes a glove box opening 20 and an opening 22 for receiving an air bag module 14.

As shown in FIGS. 1 and 3, the opening 22 for receiving the air bag module 14 is rectangular with rounded corners. The opening 22 is defined by an upper surface 24, a lower surface 26, a right side surface 28, and a left side surface 30. Both the upper surface 24 and the lower surface 26 extend horizontally. Both the right side surface 28 and left side surface 30 extend vertically and connect the upper surface 24 and the lower surface 26.

Figure 2:
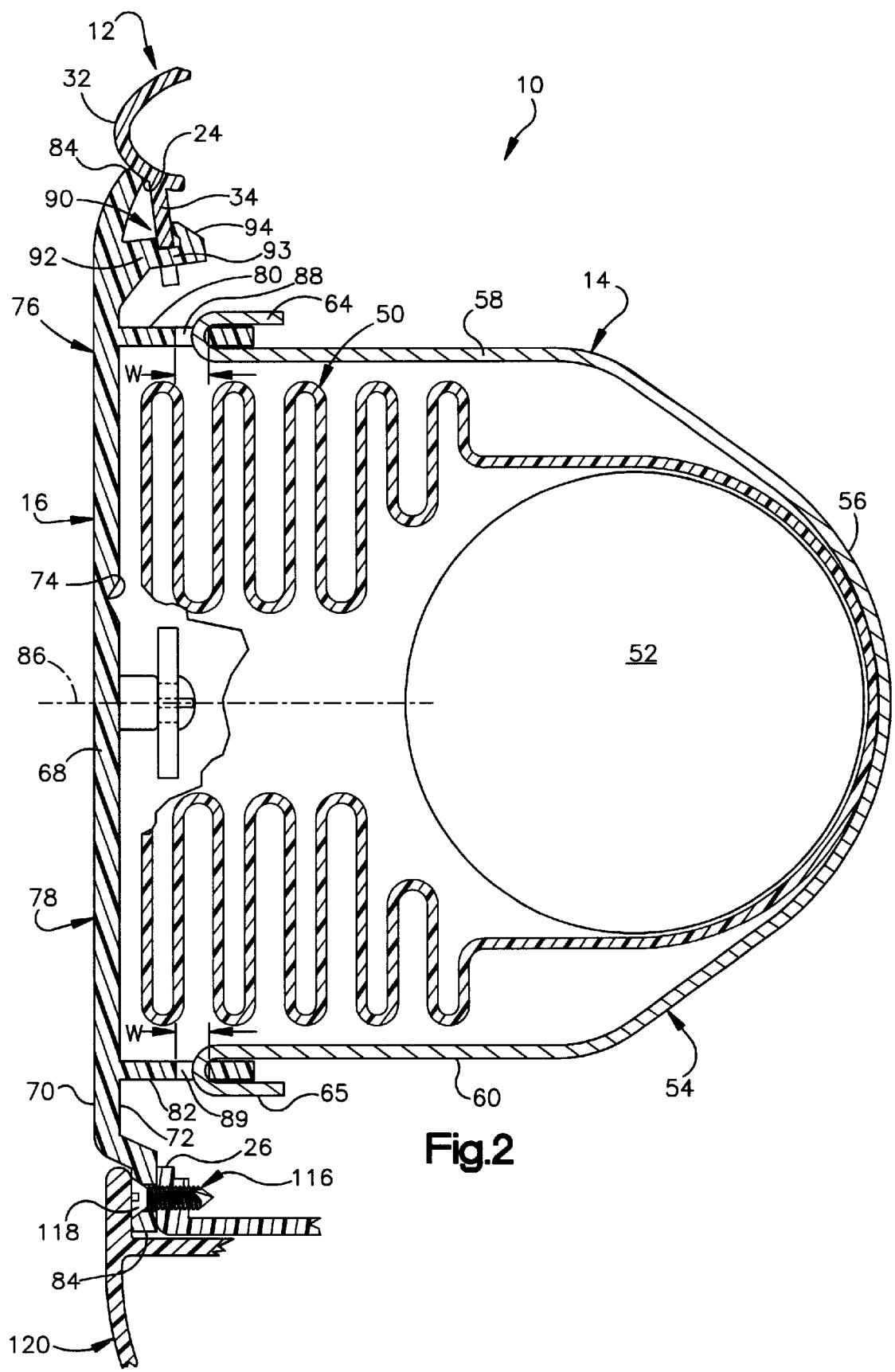
FIG. 2 is a sectional view of an assembled vehicle occupant safety apparatus of the present invention inserted into and covering an opening of an instrument panel.

The upper surface 24 forming the opening 22 in the instrument panel 12 curves slightly inwardly from the face 32 of the instrument panel 12 (FIGS. 2 and 5).

The face 32 of the instrument panel 12 faces the vehicle occupant compartment. Projecting from the upper surface 24 is a plurality of flanges 34 for connecting to a door 16. As shown in FIGS. 1 and 3, the flanges 34 are U-shaped, and each flange 34 extends into the opening 22 of the instrument panel 12. Each flange 34 has a main body portion 36 that is contiguous with and extends from the upper surface 24. The main body portion 36 of each flange 34 is trapezoidal (FIG. 3). The main body portion 36 narrows as it extends into the opening 22 of the instrument panel 12. A bottom surface 40 is the narrowest surface of the main body portion 36 of each U-shaped flange 34. Two legs 42 extend downwardly from the bottom surface 40 of the main body portion 36 of the flange 34. Each leg 42 extends from an end of the bottom surface 40. Each leg 42 becomes wider as it extends away from the main body portion 36 of the U-shaped flange 34.

The distance between the legs of each U-shaped flange 34 decreases as the legs extend away from the main body portion 36.

The U-shaped flanges 34 are molded as one piece with the instrument panel 12. The legs 42 of the U-shaped flanges 34 are resilient and, if deflected, snap back into their original position.

As shown in FIGS. 1 and 3, on the right side surface 28 forming the opening 22 of the instrument panel 12 is a centrally located protrusion 46 that extends into the opening 22. The protrusion 46 is square and has a width and a height in the range of 10–30% of the height of the right side surface 28. The height of the right side surface 28 is the distance between the upper surface 24 and the lower surface 26 forming the opening 22 in the instrument panel. A circular bore 48 extends through the protrusion 46.

The left side surface 30 forming the opening 22 of the instrument panel is a mirror image of the right side surface 28. A centrally located protrusion 46 is disposed on the left side surface 30. The size of the protrusion 46 on the left side surface 30 equals the size of the protrusion 46 on the right side surface 28. Like the protrusion 46 on the right side surface 28, a circular bore 48 extends through the protrusion 46 on the left side surface 30.

As shown in FIG. 1, the lower surface 26 forming the opening 22 in the instrument panel 12 is located immediately above the glove box opening 20. A portion of a metal reinforcement (not shown) for the instrument panel 12 is located beneath the lower surface 26 to provide support for the instrument panel 12 in the area between the two openings 20 and 22.

As shown in FIG. 2, the air bag module 14 includes an air bag 50, an inflator 52, and a reaction can 54. The reaction can 54 has a curved rear wall portion 56 that interconnects an upper wall portion 58 of the reaction can 54 and a lower wall portion 60 of the reaction can 54. Two end wall portions 62, only one of which is shown in FIG. 1, close the axial ends of the reaction can 54.

The upper wall portion 58 of the reaction can 54 terminates with a hook 64. The hook 64 extends upwardly from the terminal end of the upper wall portion 58 and extends a short distance toward the rear wall portion 56 of the reaction can 54. In the preferred embodiment, a single hook 64 extends along the entire axial length, into the paper as viewed in FIG. 2, of the upper wall portion 58 of the reaction can 54.

The lower wall portion 60 of the reaction can 54 also terminates with a hook 65. The hook 65 extends downwardly from the terminal end of the lower wall portion 60 and extends a short distance toward the rear wall portion 56 of the reaction can 54. In the preferred embodiment, a single hook 65 extends along the entire axial length, into the paper as viewed in FIG. 2, of the lower wall portion 60 of the reaction can 54.

The reaction can 54 forms a trough shaped cavity. An opening leading into the trough shaped cavity is located between the hooks 64 and 65 and the two end portions 62 of the reaction can 54. The inflator 52 is located within the cavity of the reaction can 54 and is fixed relative to the reaction can 54. The inflator 52 is cylindrical and extends axially between the two end portions 62 of the reaction can 54. A plurality of inflation fluid outlets (not shown) is formed in the cylindrical side wall of the inflator 52. The inflator 52, when actuated upon the occurrence of a crash condition, releases an inflation fluid that exits from the inflator 52 through the inflation fluid outlets. The inflator 52 may be any known inflator 52.

The inflation fluid from the inflator 52 inflates an air bag 50. The air bag 50, while in an uninflated state, is retained within the trough shaped cavity of the reaction can 54. Fasteners (not shown), such as threaded studs and nuts, secure the inflator 52 and the air bag 50 to the reaction can 54.

The door 16 of the vehicle occupant safety apparatus 10 is formed as one piece, preferably from a thermoplastic material. The color and exterior texture of the door 16 may be selected to match the instrument panel 12 so that the door 16 appears as an integral part of the instrument panel 12.

As shown in FIG. 2, the door 16 includes a front panel 68. The front panel 68 forms a cover for the opening 22 of the instrument panel 12. The front panel 68 includes an outer surface 70 and an inner surface 72. The outer surface 70 of the front panel 68 faces the vehicle occupant. The inner surface 72 of the front panel 68 faces the front of the vehicle and includes a tear seam 74. Preferably, the tear seam 74 extends horizontally across the front panel 68. The tear seam 74 is rupturable under the force of the inflating air bag 50 to allow the air bag 50 to deploy through the opening 22 of the instrument panel 12 and into the vehicle occupant compartment.

The door 16 includes an upper portion 76 and a lower portion 78. The tear seam 74 separates the upper portion 76 and the lower portion 78. As shown in FIG. 2, two inwardly extending flanges 80 and 82 extend from the inner surface 72 of the front panel 68. The inwardly extending flange 80 extends from the upper portion 76 of the door 16, and the inwardly extending flange 82 extends from the lower portion 78 of the door 16. Each flange 80 and 82 is located approximately one-third of the distance from an outer edge 84 of the door 16 to a vertical center 86 of the door 16. The flanges 80 and 82 extend at an angle that is approximately perpendicular to the front panel 68 of the door 16.

An elongated slot 88 extends through flange 80. The slot 88 receives hook 64 of the reaction can 54 of the air bag module 14. An elongated slot 89 extends through flange 82. The slot 89 receives hook 65 of the reaction can 54 of the air bag module 14. Each of the elongated slots 88 and 89 has a width W (FIG. 2) that is sufficiently large to allow the door 16, when attached to the air bag module 14, to move relative to the air bag module 14. When attached to the air bag module 14, the door 16 closes the opening of the trough shaped cavity formed by the reaction can 54.

The upper portion 76 of the door 16 also includes a plurality of L-shaped flanges 90, one of which is shown in FIG. 2, that extend inwardly from the inner surface 72 of the front panel 68 of the door 16. The L-shaped flanges 90 are located near the outer edge 84 of the upper portion 76 of the door 16, and each L-shaped flange 90 aligns with a U-shaped flange 34 extending from the instrument panel 12. Each L-shaped flange 90 includes a base portion 92, a neck portion 93, and a head portion 94.

The base portion 92 includes a lower surface 96 (FIG. 5) and an upper surface 98. The upper surface 98 is nearest the outer edge 84 of the upper portion 76 of the door 16 and extends inwardly from the inner surface 72 of the front panel 68 of the door 16. The lower surface 96 of the base portion 92 extends inwardly from the inner surface 72 of the front panel 68 of the door 16 and upwardly toward the upper surface 98. The lower surface 96 extends at an angle of approximately forty-five degrees relative to the upper surface 98. The lower surface 96 extends at this angle until extending inwardly to a location at approximately 75 percent of the inward length of the upper surface 98. The lower surface 96 then extends parallel to the upper surface 98 the remainder of the inward length of the upper surface 98. An end surface 95 of the base portion 92 extends perpendicular to the upper surface 98 and terminates short of the lower surface 96.

The neck portion 93 extends inwardly from the base portion 92. The neck portion includes a lower surface 97 and an upper surface 99. The neck portion 93 has a height, defined as the distance between the lower and upper surfaces 97 and 99, that is approximately one-half the height of the base portion 92 immediately adjacent the neck portion 93. The lower surface 97 of the neck portion 93 aligns with and is a continuation of the lower surface 96 of the base portion 92 and extends inwardly. The upper surface 99 of the neck portion 93 also extends inwardly and is parallel to the lower surface 97 of the neck portion 93. The neck portion 93 also has a depth, extending into the paper as viewed in FIG. 5, that is sized to snap between the legs 42 of the U-shaped flange 34. Thus, the depth of the neck portion 93 is less than the distance between the legs 42 at a location near the main body portion 36 of a respective U-shaped flange but is greater than the distance between the legs 42 of the U-shaped flange 34 away from the main body portion 36.

The head portion 94 of the L-shaped flange 90 extends inwardly from the neck portion and also extends toward the outer edge 84 of the upper portion 76 of the door 16. The head portion 94 includes a nose portion 100. The nose portion 100 extends outwardly over the upper surface 99 of the neck portion 93. The nose portion 100 includes a surface 101 for locking against the main body portion 36 of the U-shaped flange 34. Surface 101 of the nose portion 100 extends parallel to end surface 95 of the base portion 92. The head portion 94 has a depth, again extending into the paper as viewed in FIG. 5, that is less than or equal to the depth of the neck portion 93.

FIG. 1 shows two buttons 102 for mounting in the protrusions 46 that extend from the right and the left side surfaces 28 and 30 of the instrument panel 12. The buttons 102 are independent pieces for, when inserted in the protrusions 46, supporting a portion of the door 16. As shown in FIG. 4, each button 102 includes a cylindrical main body portion 104, a neck portion 106, and a head portion 108.

The cylindrical main body portion 104 of each button 102 extends for approximately sixty percent of the length of the button 102 and includes a flat circular surface 110 at one end of the main body portion 104. The neck portion 106 extends from an end of the main body portion 104 opposite surface 110. The neck portion 106 is approximately one-half the diameter of the main body portion 104 and extends for approximately twenty percent of the length of the button 102.

The head portion 108 of the button 102 extends from the neck portion 106 on a side opposite the main body portion 104. The head portion 108 has a hemispherical shape with a diameter equal to the diameter of the main body portion 104 of the button 102. This results in an annular, flat surface 112 of the head portion 108 extending radially outwardly from the neck portion 106. Four slots 114, two of which are shown in FIG. 4, extend partially through the head portion 108. The slots 114 extend from the outer circumference of the flat surface 112 of the head portion 108 inwardly to the diameter of the neck portion 106. The slots 114 are spaced at 90-degree intervals from one another around the annular, flat surface 112. The button 102 is formed as one piece from either rubber or a thermoplastic material. Thus, the head portion 108 of the button is resiliently deformable.

To mount the vehicle occupant safety apparatus 10 in the opening 22 of the instrument panel 12, the door 16 is first attached to the reaction can 54. The door 16 is attached to the reaction can 54 by inserting the hook 64 of the upper wall portion 58 of the reaction can 54 through the elongated slot 88 in the inwardly extending flange 80 of the door 16. The door 16 is also attached to the reaction can 54 by inserting the hook 65 of the lower wall portion 60 of the reaction can 54 through the elongated slot 89 in the inwardly extending flange 82 of the door 16. The two buttons 102 are inserted into the corresponding bores 48 in the protrusions 46 that extend from the right and the left side surfaces 28 and 30 of the instrument panel 12. As shown in FIG. 4 with reference to one button 102, after the head portion 108 of the button 102 is inserted through the corresponding bore 48, the head portion 108 is located on the forward facing side of the protrusion 46 and the cylindrical main body 104 of the button 102 is located on rearward facing side of the protrusion 46. Thus, when a button 102 is connected to the protrusion 46, the neck portion 106 extends through the bore 48 in the respective protrusion 46 and the flat surface 110 of the main body portion 104 of the button 102 faces the vehicle occupant compartment.

After the buttons 102 are inserted into the bores 48 of the protrusions 46, the air bag module 14 is inserted into the opening 22 in the instrument panel 12 and is secured the instrument panel 12. The upper portion 76 of the door 16 is then moved relative to the air bag module 14 and relative to the instrument panel 12 to a position where the L-shaped flanges 90 of the door 16 become aligned with and snap together with the U-shaped flanges 34 of the instrument panel 12. When snapping together, the legs 42 of each U-shaped flange 34 are deflected laterally outwardly, i.e., away from one another, as the neck portion 93 of the respective L-shaped flange 90 passes between the legs 42 to interlock with the U-shaped flange 34. Once the neck portion 93 passes between the legs 42 of the U-shaped flange 34, the legs 42 return to their original position to lock the neck portion between them. Also, when a U-shaped flange 34 is interlocked with an L-shaped flange 90, as shown in FIG. 5, the bottom surface 40 of the main body portion 36 of the U-shaped flange 34 is received between the end surface 95 and the nose portion 100 of the L-shaped flange 90. Preferably, surface 101 of the nose portion 100 of the head portion 94 of the L-shaped flange 90 abuts the main body portion 36 of the U-shaped flange 34.

Then, the lower portion 78 of the door 16 is moved so that a portion of the inner surface 72 of the front panel 68 of the door 16 rests on the flat surface 110 of each button 102. As shown in FIG. 2, when the door 16 is resting on the flat surfaces 110 of the buttons 102, the lower portion 78 of the door 16 extends over the lower surface 26 of the instrument panel 12 forming the opening 22. Fasteners 116 are then inserted into the lower portion 78 of the door 16 to connect the lower portion 78 of the door 16 to the instrument panel 12. Preferably the fasteners 116 are self-tapping and secure the lower portion 78 of the door 16 to the reinforcement (not shown) located behind the instrument panel 12. When the door 16 is secured to the instrument panel 12, an interference fit exists between the upper portion 76 of the door 16 and the instrument panel 12. The interference fit is leaves a gap of between 1 mm and 1.5 mm between the outer edge 84 of the upper portion 76 of the door 16 and the instrument panel 12 (the gap is not shown in FIG. 5). After installation of the fasteners 116, the heads 118 of the fasteners 116 can be seen from within the vehicle occupant compartment. A glove box door 120 or a bezel covers the fastener heads 118 so that the heads 118 are not visible to a vehicle occupant.

Those skilled in the art will recognize that the illustrated air bag module 14 is for purposes of example only. Any air bag module 14 with provisions for attaching a door 16.and allowing the door 16 to move relative to the air bag module 14 is within the scope of this invention.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant safety apparatus comprising:
    an air bag module having an air bag that is inflatable through an opening of an instrument panel for helping to protect a vehicle occupant during a crash condition; and
    a door for covering the opening in the instrument panel, the door being attached to the air bag module and being movable relative to the air bag module to position the door relative to the instrument panel;
    the door and the instrument panel having respective interlocking portions which snap together to attach the door to the instrument panel when the air bag module is inserted into the opening in the instrument panel and the door is moved relative to the air bag module, the interlocking portions of the instrument panel deflecting when the respective interlocking portions of the door and the instrument panel snap together;
    wherein the interlocking portions of the instrument panel are U-shaped flanges, each U-shaped flange having two legs that extend into the opening of the instrument panel and deflect away from each other when the respective interlocking portions of the instrument panel and the door snap together.

2. The vehicle occupant safety apparatus of claim 1 wherein the interlocking portions of the door are L-shaped flanges, and when the respective interlocking portions of the instrument panel and the door snap together a nose portion of each L-shaped flange abuts a surface of a U-shaped flange to attach the door to the instrument panel.

3. The vehicle occupant safety apparatus of claim 2 wherein the instrument panel has a plurality of protrusions that extend into the opening, each protrusion having a bore; and
    the apparatus further comprises a plurality of buttons, each button having a portion for extending through the bore and an end surface, the portion of the button extending through the bore attaching the button to a corresponding protrusion of the instrument panel such that the end surface of the button supports a portion of the door when the door is moved into a position to cover the opening in the instrument panel.

4. The vehicle occupant safety apparatus of claim 3 further comprising a plurality of fasteners for attaching a portion of the door to the instrument panel.

5. The vehicle occupant safety apparatus of claim 4 wherein the opening in the instrument panel has an upper surface, a lower surface, and two side surfaces, the U-shaped flanges extending from an upper surface of the opening, and the plurality of protrusions extending from the side surfaces of the opening; and
    the door having an upper portion and a lower portion, the upper portion of the door having the L-shaped flanges, and the lower portion of the door being connected to the instrument panel by the plurality of fasteners.

6. A method of mounting a vehicle occupant safety apparatus in an opening of an instrument panel, the method comprising the steps of:
    (d) attaching a door to an air bag module in a manner such that the door is movable relative to the air bag module;
    (e) inserting a button into a bore in a protrusion formed on the instrument panel such that an end surface of the button extends to support a portion of the door when the door is moved into a position to cover the opening;
    (f) inserting the air bag module into the opening of the instrument panel; and
    (g) moving the door relative to the air bag module and relative to the instrument panel so that respective interlocking portions of the instrument panel and the door snap together, the interlocking portions of the instrument panel deflecting when the respective interlocking portions of the door and the instrument panel snap together.

7. The method of claim 6 further comprising the step of: fastening a portion of the door to the instrument panel using a plurality of fasteners.

8. A vehicle occupant safety apparatus comprising:
    an air bag module having an air bag that is inflatable through an opening of an instrument panel for helping to protect a vehicle occupant during a crash condition; and
    a door for covering the opening in the instrument panel, the door being attached to the air bag module in a manner so as to permit the door to be moved relative to the air bag module and the instrument panel to position the door relative to the instrument panel during attachment of the door to the instrument panel;
    the door and the instrument panel having respective interlocking portions for securing the door to the instrument panel, each interlocking portion of the instrument panel including a pair of legs between which an associated interlocking portion of the door is received, the legs deflecting away from one another to receive the associated interlocking portion of the door and snapping together to lock the associated interlocking portion of the door between the legs and to secure the door to the instrument panel.

9. The vehicle occupant safety apparatus of claim 8 wherein each interlocking portion of the instrument panel extends into the opening from a surface of the instrument panel defining the opening.

10. The vehicle occupant safety apparatus of claim 9 wherein a distance between the legs of each interlocking portion of the instrument panel decreases as the legs extend farther away from the surface of the instrument panel and into the opening.

11. A method of mounting a vehicle occupant safety apparatus in an opening of an instrument panel, the method comprising the steps of:

(a) attaching a door to an air bag module in a manner such that the door is movable relative to the air bag module while attached to the air bag module;

(b) inserting the air bag module, with the door movably attached to the air bag module, into the opening of the instrument panel; and thereafter (c) moving the door, which is movably attached to the air bag module, relative to the air bag module and relative to the instrument panel so that respective interlocking portions of the instrument panel and the door snap together and secure the door to the instrument panel, the interlocking portions of the instrument panel deflecting when the respective interlocking portions of the door and the instrument panel snap together.

12. The method of claim 11 wherein the step of moving the door further includes the steps of:

providing each interlocking portion of the instrument panel with a pair of legs; and receiving an associated interlocking portion of the door between the pair of legs of each interlocking portion of the instrument panel such that the legs deflect away from one another to receive the associated interlocking portion of the door and snap together to lock the associated interlocking portion of the door between the legs and to secure the door to the instrument panel.

* * * * *

UNITED STATES PATENT AND TRADEMARK OFFICE
CERTIFICATE OF CORRECTION

PATENT NO. : 6,460,874 B1
DATED : October 8, 2002
INVENTOR(S) : Jonathan McDonnell, William C. Haps, Jr. and Garry Hayes It is certified that error appears in the above-identified patent and that said Letters Patent is hereby corrected as shown below:

Column 8,
Line 31, before "attaching" change "(d)" to -- (a) --.
Line 33, before "inserting;" change "(e)" to -- (b) --.
Line 37, before "inserting;" change "(f)" to -- (c) --.
Line 39, before "moving" change "(g)" to -- (d) --.

Column 9,
Line 17, before "attaching" change "(a)" to -- (e) --.
Line 20, before "inserting;" change "(b)" to -- (f) --.

Column 10,
Line 1, before "moving" change "(c)" to -- (g) --.

Signed and Sealed this

Fourteenth Day of December, 2004

JON W. DUDAS
*Director of the United States Patent and Trademark Office*